(12) United States Patent
Pav

(10) Patent No.: US 8,045,339 B2
(45) Date of Patent: Oct. 25, 2011

(54) MULTIPLE COMPONENT MOUNTING SYSTEM

(75) Inventor: Darren B. Pav, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 706 days.

(21) Appl. No.: 12/168,885

(22) Filed: Jul. 7, 2008

(65) Prior Publication Data

US 2010/0002366 A1    Jan. 7, 2010

(51) Int. Cl.
*H05K 7/02* (2006.01)
*H05K 7/04* (2006.01)
(52) U.S. Cl. ........................................ 361/810; 361/807
(58) Field of Classification Search .......... 361/801–803, 361/807, 810, 800, 730, 752, 796, 725, 727; 312/223.1, 223.2; 439/342
See application file for complete search history.

(56) References Cited

U.S. PATENT DOCUMENTS

| | | | | |
|---|---|---|---|---|
| 5,680,293 A | * | 10/1997 | McAnally et al. | ....... 361/679.31 |
| 6,018,457 A | * | 1/2000 | Mroz | ........................ 361/679.31 |
| 6,097,604 A | * | 8/2000 | Hunter et al. | .................. 361/727 |
| 6,147,862 A | * | 11/2000 | Ho | ........................... 361/679.32 |
| 6,238,026 B1 | * | 5/2001 | Adams et al. | ............. 312/223.2 |
| 6,327,814 B1 | | 12/2001 | Tsujino et al. | |
| 6,469,890 B1 | | 10/2002 | Gan | |
| 6,487,081 B2 | | 11/2002 | Homer et al. | |
| 6,600,648 B2 | | 7/2003 | Curlee et al. | |
| 6,817,881 B2 | * | 11/2004 | Chou | ........................... 439/342 |
| 7,009,838 B2 | | 3/2006 | Roh | |
| 7,031,152 B1 | * | 4/2006 | Tsai et al. | ................ 361/679.33 |
| 7,149,081 B2 | | 12/2006 | Chen et al. | |

OTHER PUBLICATIONS

CRU Dataport has a removable HD carrier that houses two 2.5 HDs into an F3 slot, but they are not tool-less and use screws for securing the HDs http://www.cru-dataport.com/htmldocs/products/dataport25/DP25.html.
Icy Dock offers a removable 2.5"HD, but it is a single 2.5" HD that fits into an F3 slot, http://www.icydock.com/product/mb663ur-1s.html.
This bracket houses only one 2.5"HD in a 3.5" slot and requires screws for assembly http://www.addonics.com/products/io/aa25ide35.asp.

(Continued)

*Primary Examiner* — Hung S Bui
(74) *Attorney, Agent, or Firm* — Haynes and Boone, LLP

(57) ABSTRACT

A multiple component mounting system includes a first carrier including a base. A plurality of first component coupling members are located on the base and define a first component channel. At least one of the first component coupling members include a first resilient member that is operable to engage a first component when the first component is located in the first component channel in order to secure the first component to the base free of the use of a tool. A plurality of second component coupling members are located on the base and define a second component channel. At least one of the second component coupling members include a second resilient member that is operable to engage a second component when the second component is located in the second component channel in order to secure the second component to the base free of the use of a tool. A plurality of second carrier coupling members are located on the base and operable to secure the base to a second carrier that may then be mounted to an information handling system chassis.

21 Claims, 16 Drawing Sheets

OTHER PUBLICATIONS

This is for dual 2.5 HDs that fit in an F3 slot . . . not an internal HD slot. http://www.arcoide.corn/disk_micro. php http://www.pcconnection.com/ProductDetail?Sku=6043319.

This bracket allows for two 2.5 Hds but they are screw mounted http://www. mini-itx.com/store/?c=12.

* cited by examiner

MULTIPLE COMPONENT MOUNTING SYSTEM

BACKGROUND

The present disclosure relates generally to information handling systems, and more particularly to a multiple component mounting system in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs include slots for components such as, for example, storage drives. In some situations, it may be desirable to provide multiple storage drives in the IHS. In one example, the IHS includes a plurality of slots for housing components. A 3.5" storage drive is typically secured to a 3.5" storage drive carrier using screws, and that carrier is then positioned in one of the slots and coupled to the IHS. The provision of multiple storage drives in such a system raises a number of issues.

A common solution is to simply couple additional 3.5" storage drives in the free slots on the IHS. However, such solutions use up valuable volume in the IHS and result in a relatively high power consumption compared to the situation where only one storage drive is used. Furthermore, because each of the multiple 3.5" storage drives must first be screwed to their respective carriers, the manufacturing time of the IHS increases as well.

Accordingly, it would be desirable to provide for mounting multiple components to an IHS which avoids the issues discussed above.

SUMMARY

According to one embodiment, a multiple component mounting system includes a first carrier including a base, a plurality of first component coupling members located on the base and defining a first component channel, wherein at least one of the first component coupling members include a first resilient member that is operable to engage a first component when the first component is located in the first component channel in order to secure the first component to the base free of the use of a tool, a plurality of second component coupling members located on the base and defining a second component channel, wherein at least one of the second component coupling members include a second resilient member that is operable to engage a second component when the second component is located in the second component channel in order to secure the second component to the base free of the use of a tool, and a plurality of second carrier coupling members located on the base and operable to secure the base to a second carrier.

BRIEF DESCRIPTION OF THE DRAWINGS

FIG. 3b is a bottom perspective view illustrating an embodiment of the first carrier of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
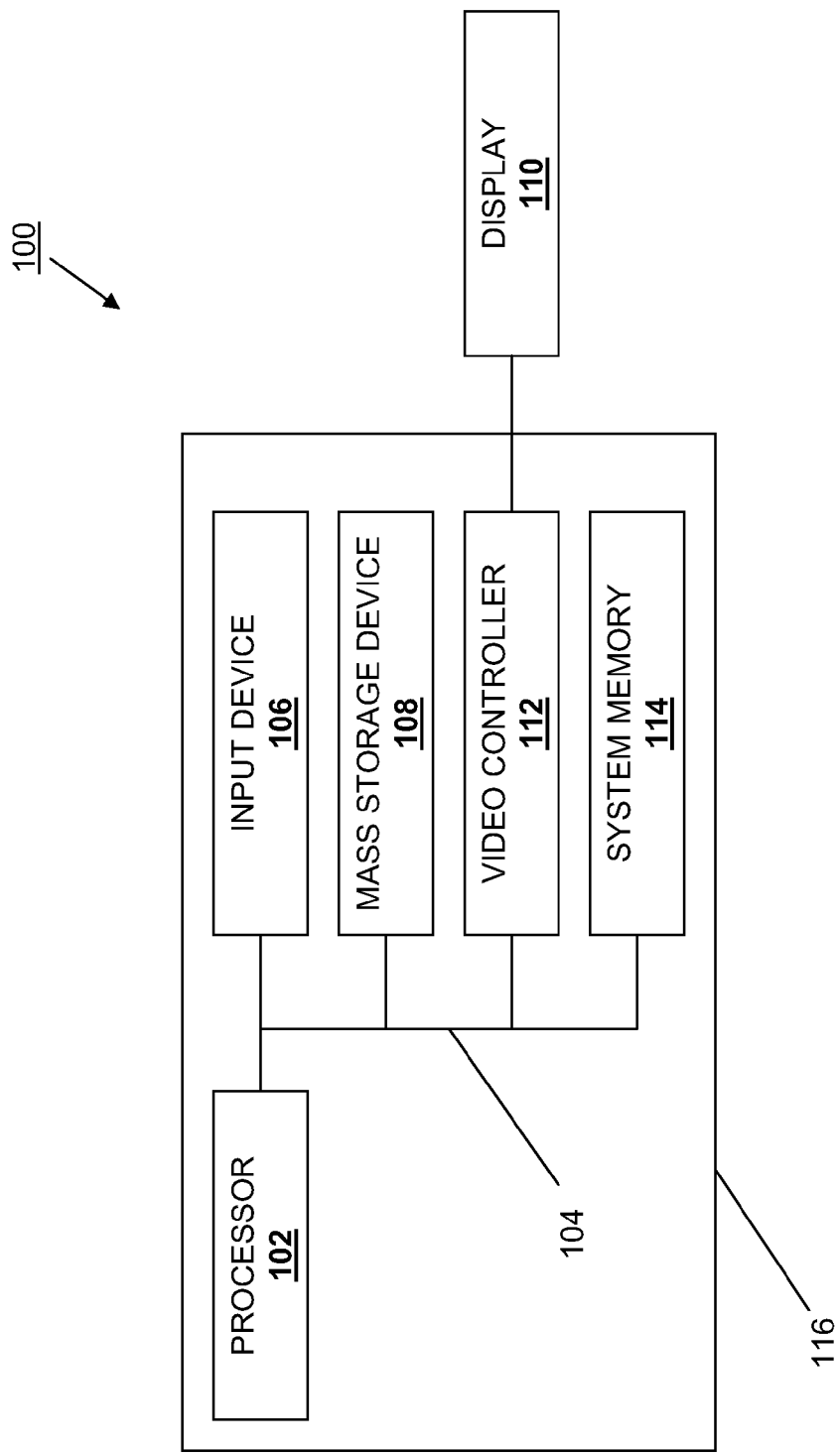
FIG. 1 is a schematic view illustrating an embodiment of an IHS.

In one embodiment, an IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
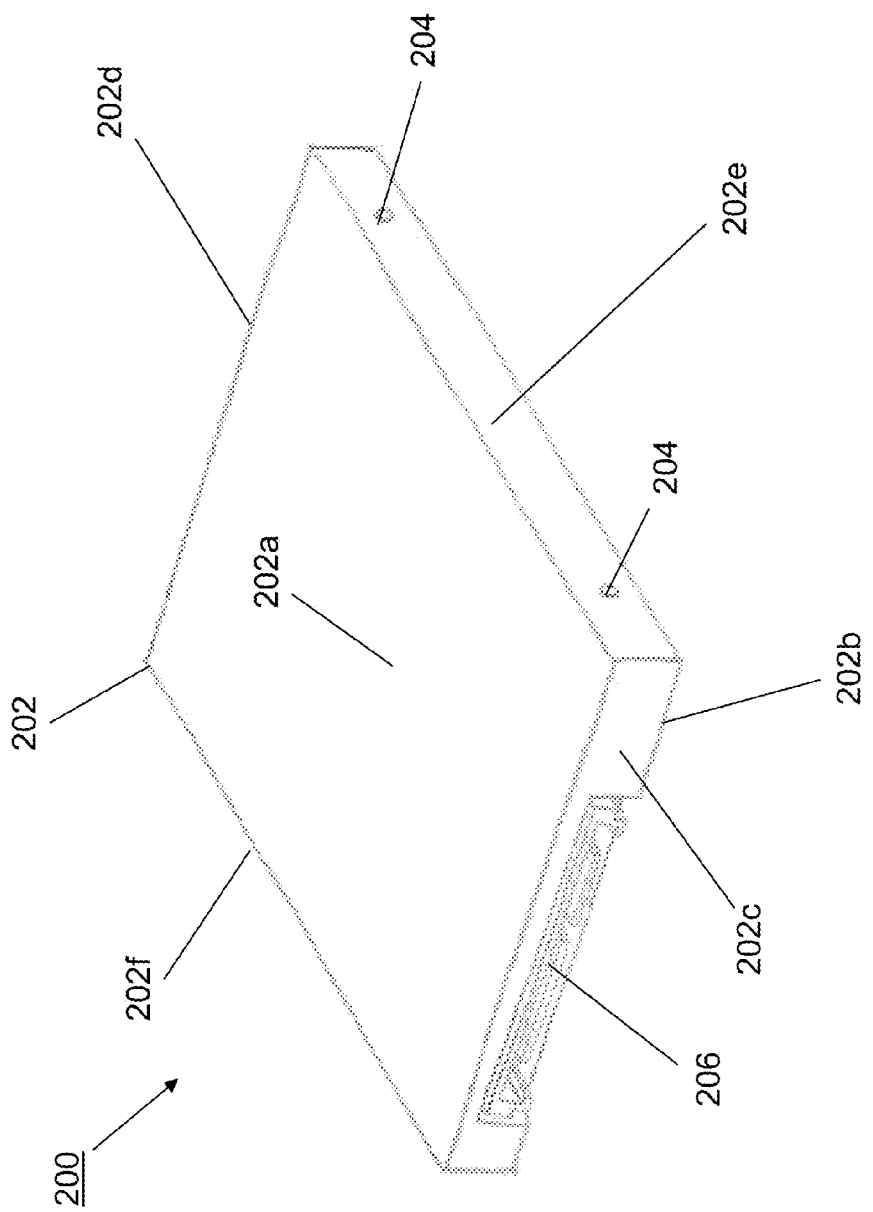
FIG. 2 is a perspective view illustrating an embodiment of a component.

Referring now to FIG. 2, a component 200 is illustrated. The component 200 includes a base 202 having a top surface 202a, a bottom surface 202b located opposite the top surface 202a, a front surface 202c extending between the top surface 202a and the bottom surface 202b, a rear surface 202d located opposite the front surface 202c and extending between the top surface 202a and the bottom surface 202b, and a pair of opposing sides surfaces 202e and 202f extending between the top surface 202a, the bottom surface 202b, the front surface 202c, and the rear surface 202d. A pair of first carrier coupling members 204 are located on the side surface 202e, and similar first carrier coupling members (not shown) are located on the side surface 202f. In an embodiment, the first carrier coupling members are apertures defined by and extending into the base 202. An IHS connector 206 extends from the base 202 adjacent the front surface 202c. In an embodiment, the component 200 may be a storage device such as, for example, a hard drive, a flash memory drive, an optical drive, a memory device, and/or a variety of other storage drives known in the art. In an embodiment, the component 200 is the mass storage device 108, described above with reference to FIG. 1. In the illustrated embodiment, the component 200 is a 2.5" Serial Advanced Technology Attachment (SATA) drive.

Figure 3A:
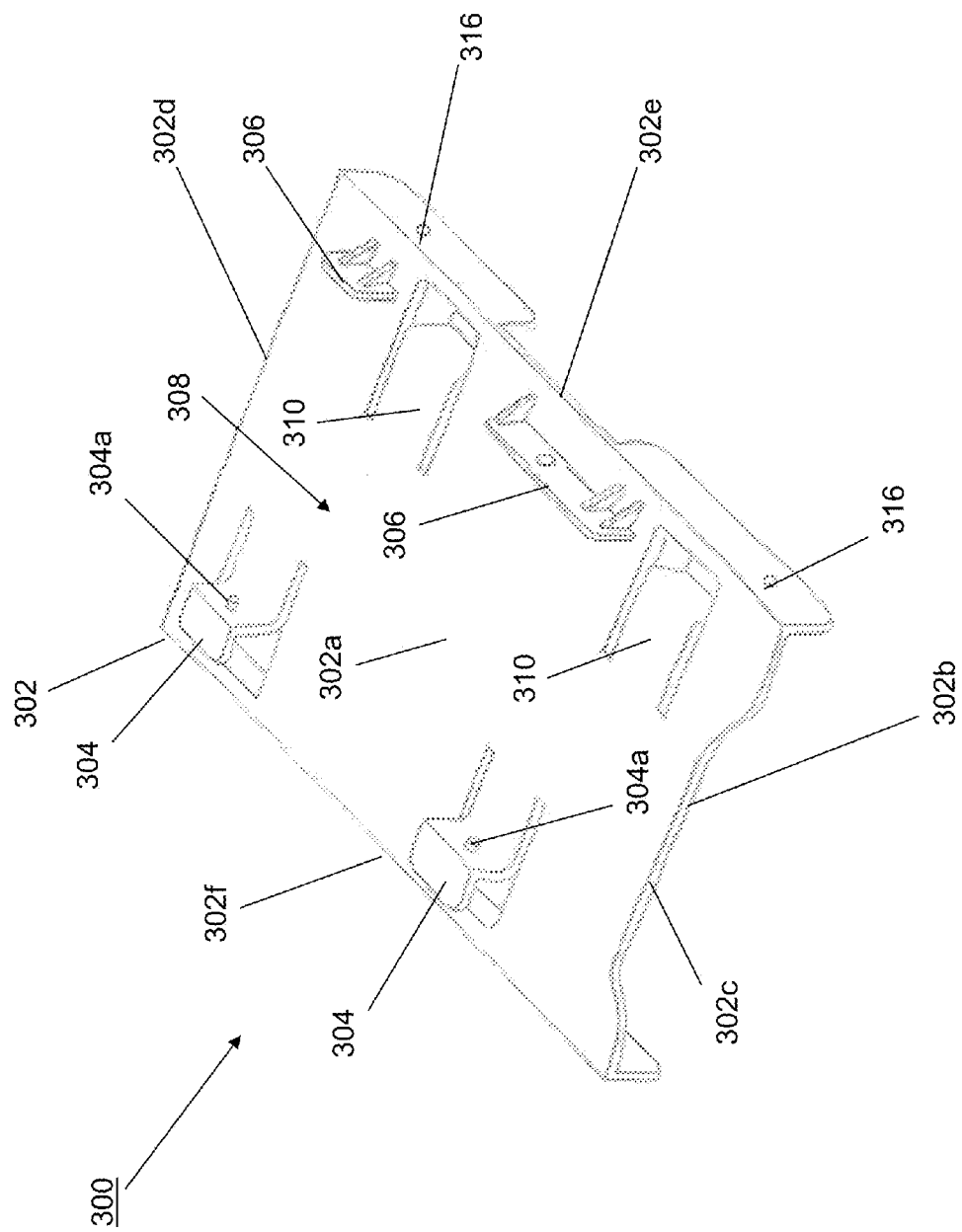
FIG. 3a is a top perspective view illustrating an embodiment of a first carrier used with the component of FIG. 2.
Figure 3B:
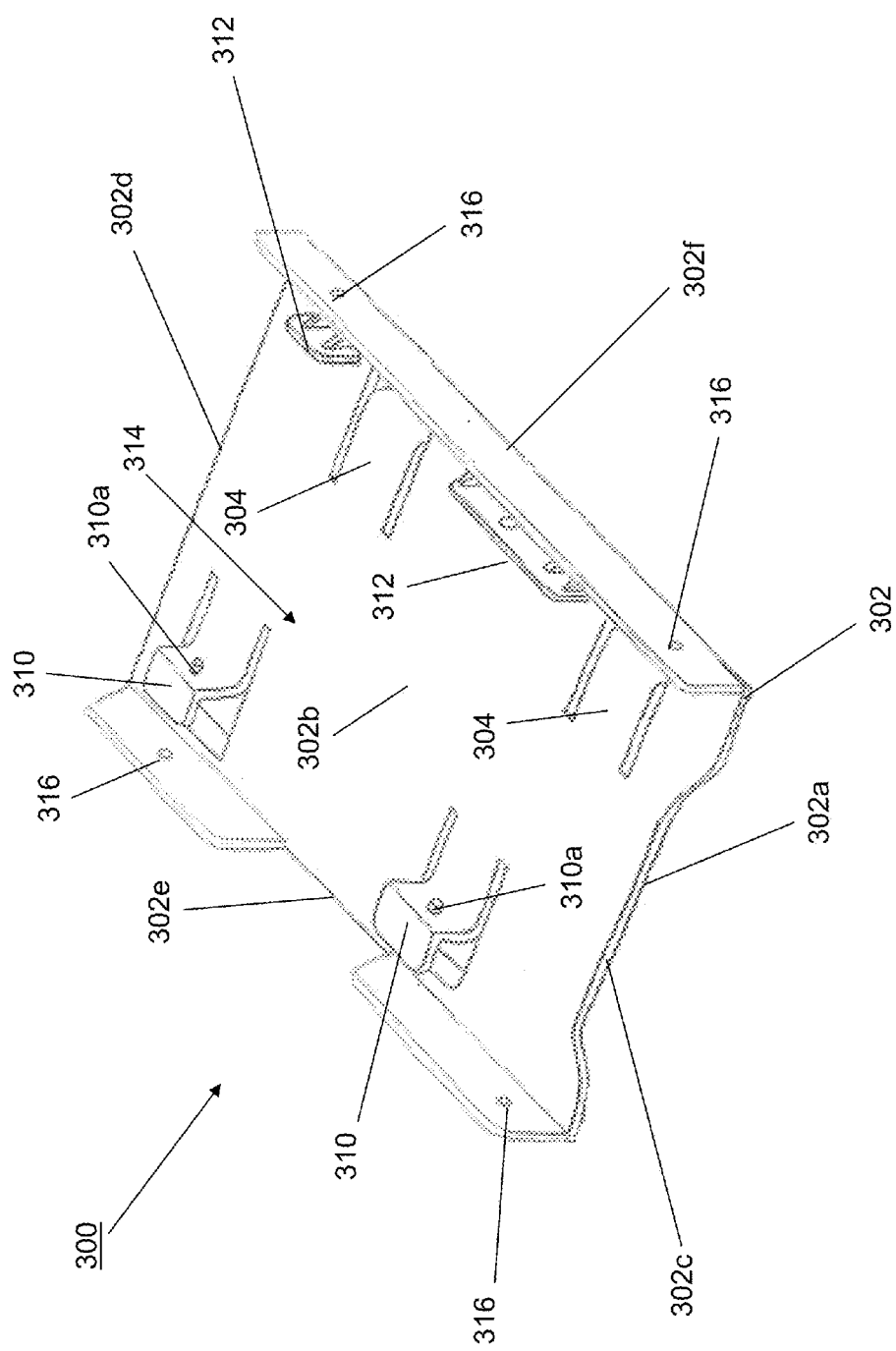
Figure 3C:
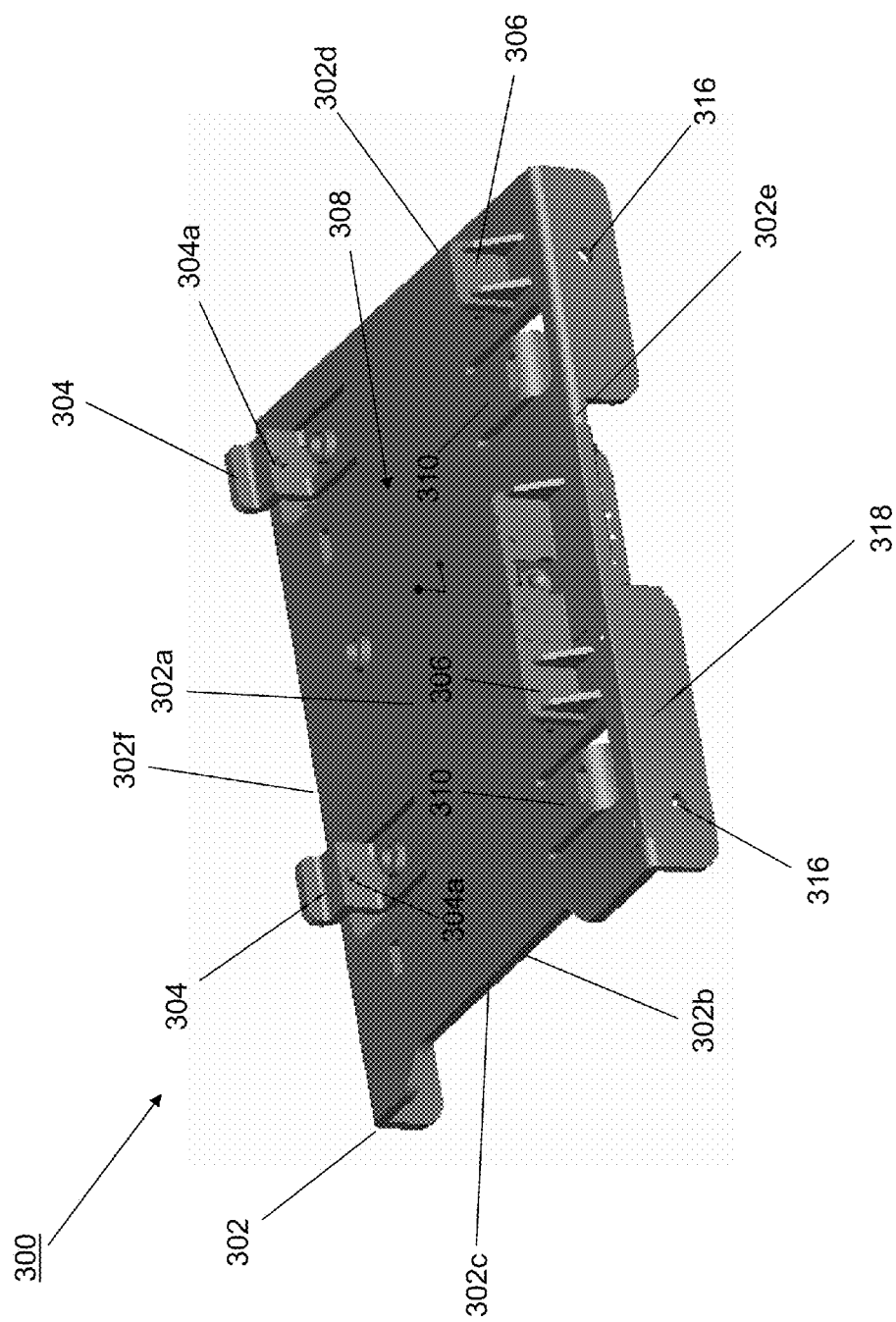
FIG. 3c is a top perspective view illustrating an embodiment of the first carrier of FIG. 3a including an EMI grounding member.

Referring now to FIGS. 3a, 3b and 3c, a first carrier 300 is illustrated. The first carrier 300 includes a base 302 having a top surface 302a, a bottom surface 302b located opposite the top surface 302a, a front edge 302c extending between the top surface 302a and the bottom surface 302b, a rear edge 302d located opposite the front surface 302c and extending between the top surface 302a and the bottom surface 302b, and a pair of opposing side edges 302e and 302f extending between the top surface 302a, the bottom surface 302b, the front edge 302c, and the rear edge 302d. A plurality of first component coupling members extend from the top surface 302a of the base 302 and include a pair of resilient members 304 located adjacent the side edge 302f and a pair of rigid walls 306 located adjacent the side edge 302e. In the illustrated embodiment, the resilient members 304 each include a coupling peg 304a that extends from the resilient members 304 and the rigid walls 306 each include a coupling peg (not shown) that is similar to the coupling peg 304a. A first component channel 308 is defined between the first component coupling members (e.g., in the illustrated embodiment, between the resilient members 304 and the rigid walls 306) and the top surface 302a of the base 302. A plurality of second component coupling members extend from the bottom surface 302b of the base 302 and include a pair of resilient members 310 located adjacent the side edge 302e and a pair of rigid walls 312 located adjacent the side edge 302f. In the illustrated embodiment, the resilient members 310 each include a coupling peg 310a that extends from the resilient member 310 and the rigid walls 312 each include a coupling peg (not shown) that is similar to the coupling peg 310a. A second component channel 314 is defined between the second component coupling members (e.g., in the illustrated embodiment, between the resilient members 310 and the rigid walls 312) and the bottom surface 302b of the base 302. A pair of second carrier coupling members 316 are located on the side edge 302e, and similar second carrier coupling members 316 are located on the side edge 302f. In an embodiment, the second carrier coupling members are apertures defined by and extending through the side edges 302e and 302f. In an embodiment, an electromagnetic interference (EMI) grounding member 318 is coupled to the base 302 and located on the side edge 302e and the rigid walls 306 and 312, as illustrated in FIG. 3c. In an embodiment, the first carrier 300 comprises a single piece of material that may be molded (e.g., when the material is a plastic material), stamped (e.g., when the material is a metal material), or formed using a variety of other manufacturing techniques known in the art in order to produce the features described above, and the EMI grounding member 318 is a separate piece of material that is coupled to the first carrier 300. In an embodiment, the first carrier 300 is dimensioned to include similar dimensions to a 3.5" storage device such that it may couple to a 3.5" storage device carrier, as is described in further detail below.

Figure 4:
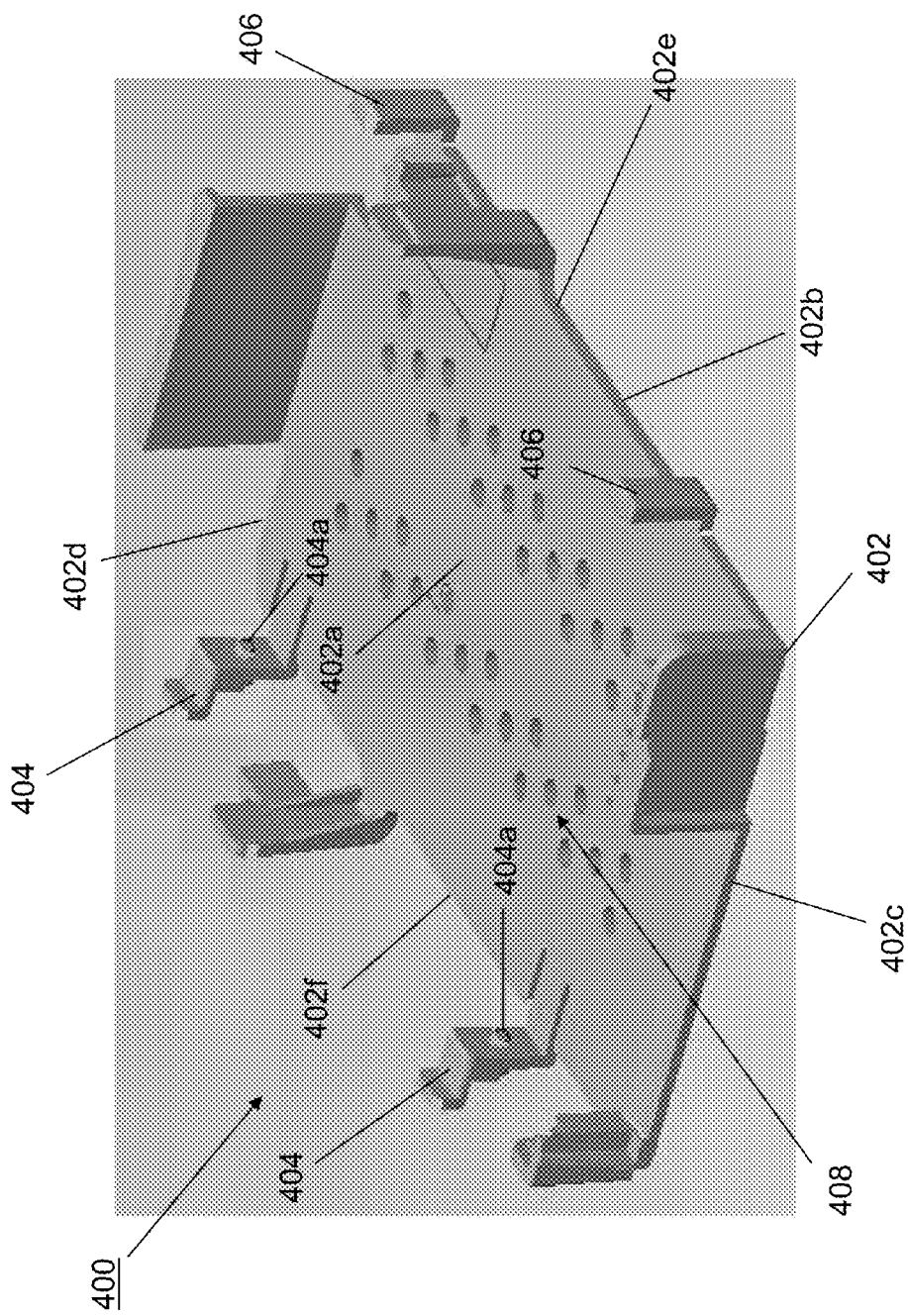
FIG. 4 is a perspective view illustrating an embodiment of a second carrier used with the component of FIG. 2 and the first carrier of FIGS. 3a, 3b and 3c.

Referring now to FIG. 4, a second carrier 400 is illustrated. The second carrier 400 includes a base 402 having a top surface 402a, a bottom surface 402b located opposite the top surface 402a, a front edge 402c extending between the top surface 402a and the bottom surface 402b, a rear edge 402d located opposite the front surface 402c and extending between the top surface 402a and the bottom surface 402b, and a pair of opposing sides edges 402e and 402f extending between the top surface 402a, the bottom surface 402b, the front edge 402c, and the rear edge 402d. A plurality of first carrier coupling members extend from the top surface 402a of the base 302 and include a pair of resilient members 404 located adjacent the side edge 402f and a pair of rigid members 406 located adjacent the side edge 302e. In the illustrated embodiment, the resilient members 404 each include a coupling peg 404a extending from the resilient member 404 and the rigid members 406 each include a coupling peg (not shown) that is similar to the coupling peg 404a. A first carrier channel 408 is defined between the first carrier coupling members (e.g., in the illustrated embodiment, between the resilient members 404 and the rigid members 406) and the top surface 402a of the base 402. In an embodiment, the second carrier 400 is dimensioned such that a 3.5" storage device may be positioned in and coupled to the first carrier channel 408, as is described in further detail below. In an embodiment, the second carrier 400 may include features that are not illustrated such as, for example, a shroud to direct airflow towards components that are positioned in the first carrier channel 408.

Figure 5:
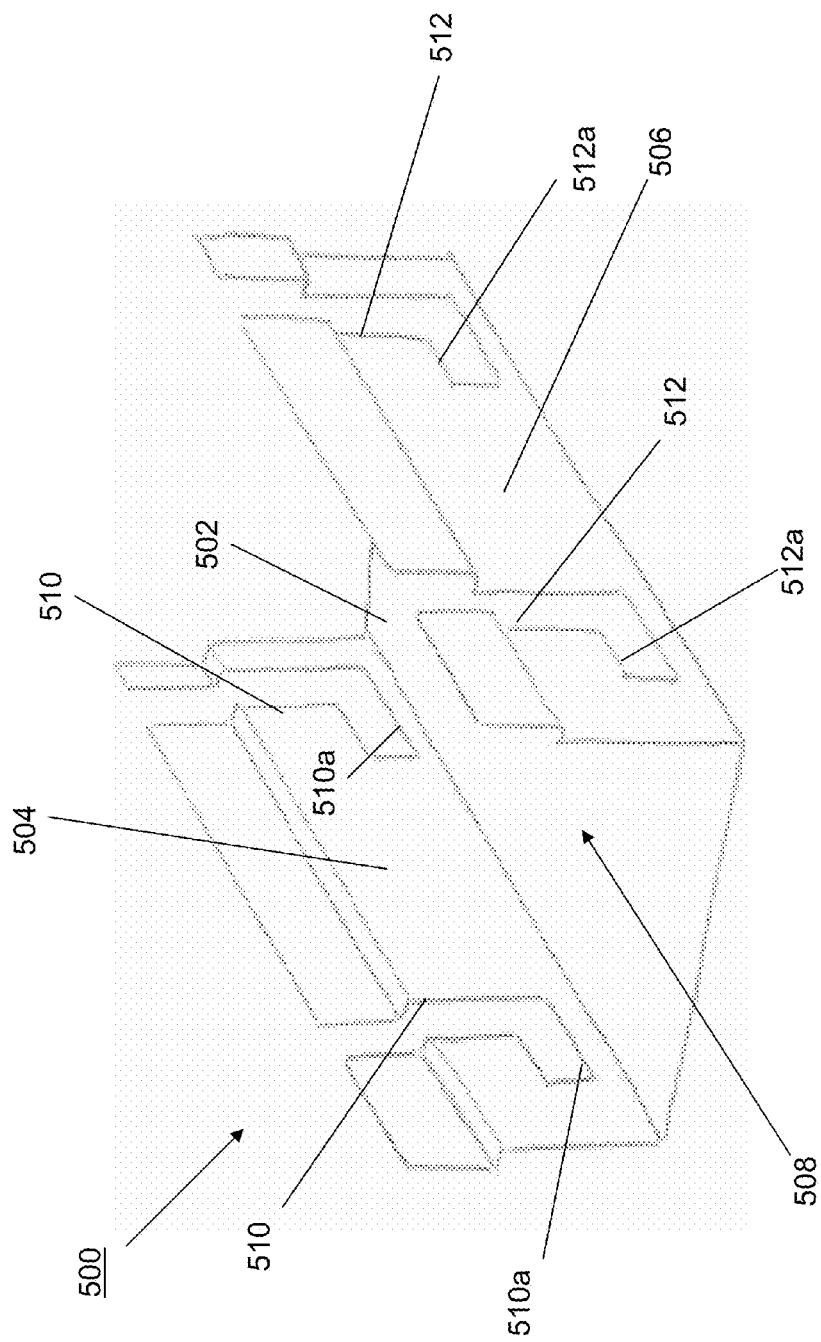
FIG. 5 is a perspective view illustrating an embodiment of a chassis used with the component of FIG. 2, the first carrier of FIGS. 3a, 3b and 3c, and the second carrier of FIG. 4.

Referring now to FIG. 5, a chassis 500 is illustrated. The chassis 500 includes a base wall 502 and a pair of side walls 504 and 506 extending from opposing edges of the base wall 502 such that the base wall 502 and the side walls 504 and 506 define a chassis component slot 508 between them. The side wall 504 defines a pair of spaced apart component coupling channels 510, each component coupling channel 510 including a securing section 510a as its distal end. The side wall 506 defines a pair of spaced apart component coupling channels 512, each component coupling channel 512 including a securing section 512a as its distal end. In an embodiment, the chassis 500 is part of the chassis 116, described above with reference to FIG. 1, and includes a plurality of connectors (not illustrated) for connecting a plurality of components to the processor 102.

Figure 6A:
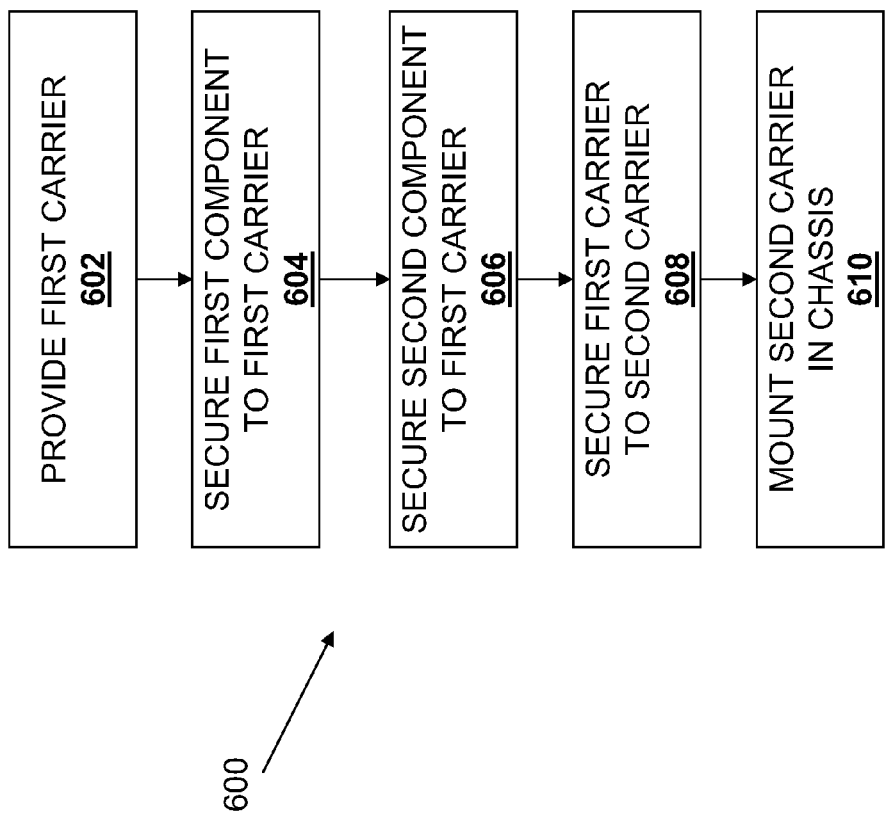
FIG. 6a is a flow chart illustrating an embodiment of a method for mounting multiple components in an IHS.
Figure 6B:
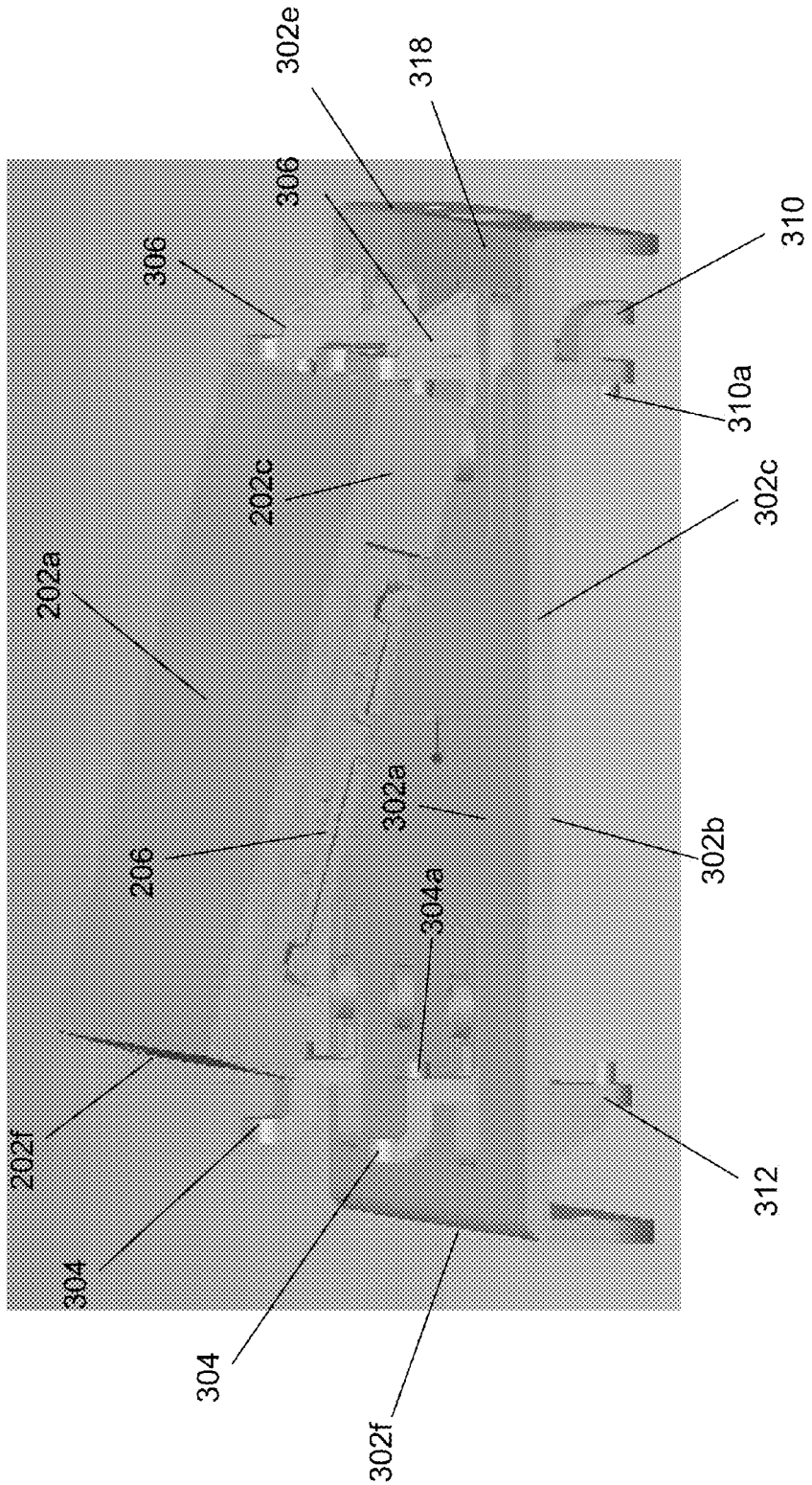
FIG. 6b is a perspective view illustrating an embodiment of the first carrier of FIGS. 3a, 3b and 3c with the component of FIG. 2 being coupled to its top surface.
Figure 6C:
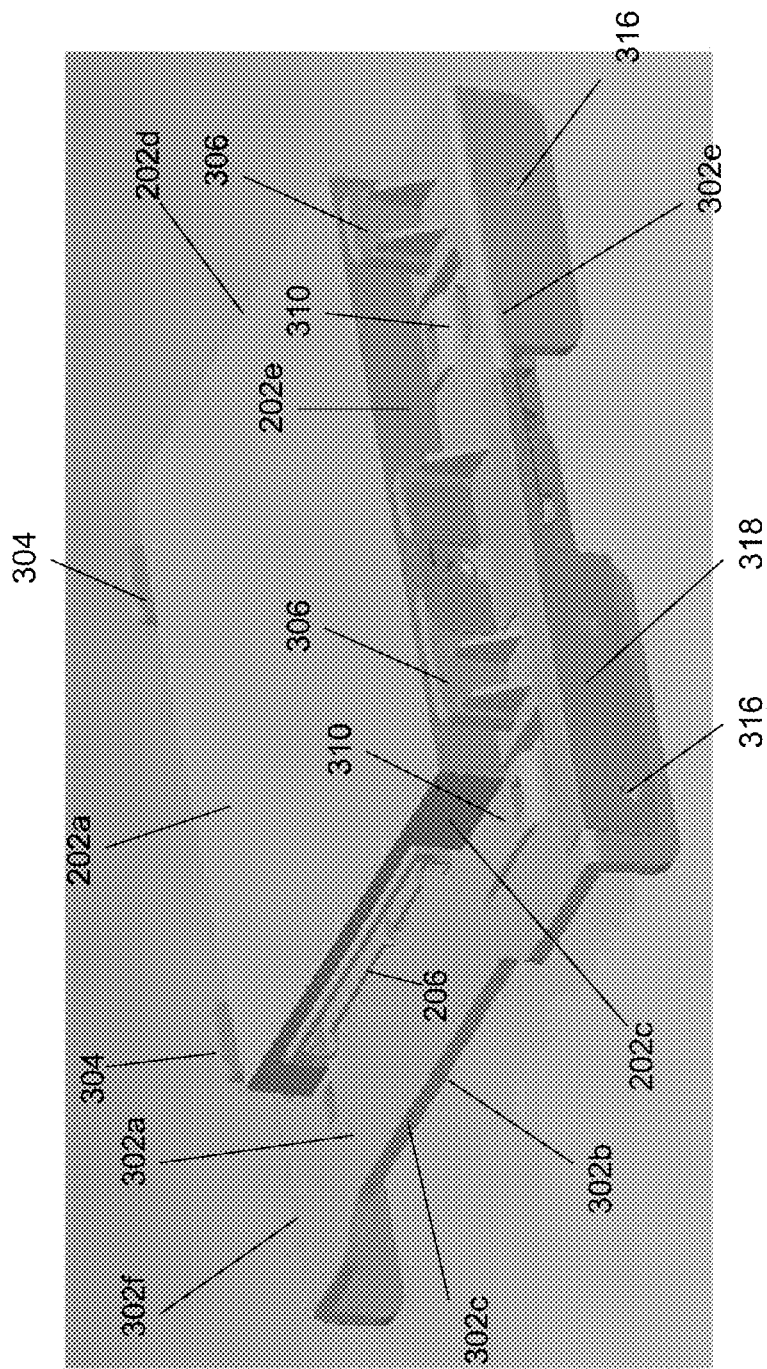
FIG. 6c is a perspective view illustrating an embodiment of the first carrier of FIGS. 3a, 3b and 3c with the component of FIG. 2 coupled to its top surface.
Figure 6D:
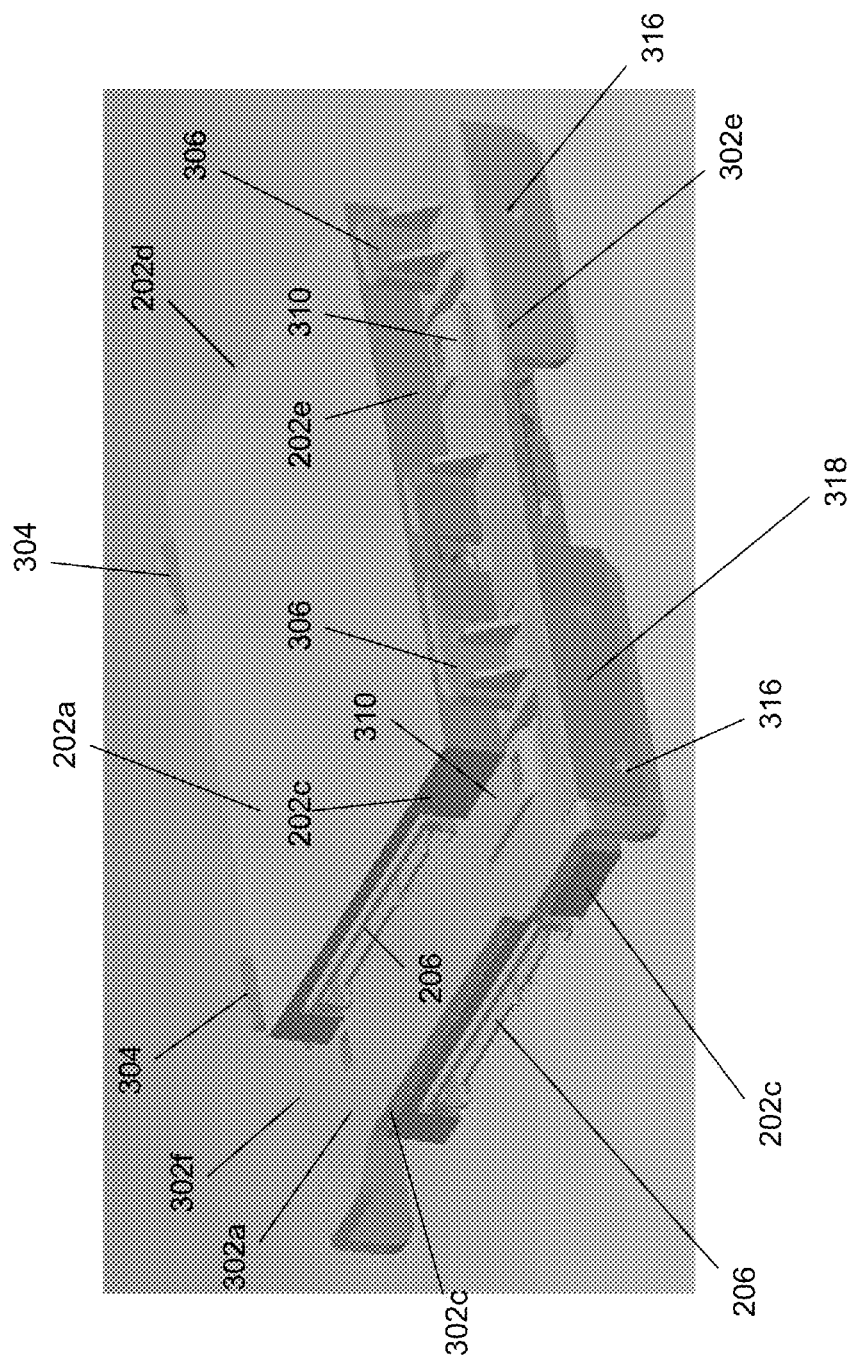
FIG. 6d is a perspective view illustrating an embodiment of the first carrier of FIGS. 3a, 3b and 3c with one of the components of FIG. 2 coupled to each of its top and bottom surface.

Referring now to FIGS. 2, 3a, 3b, 3c, 6a, 6b, 6c and 6d, a method 600 for mounting multiple components in an IHS is illustrated. The method 600 begins at block 602 where the first carrier, illustrated in FIGS. 3a, 3b and 3c, is provided. The method 600 then proceeds to block 604 where a first component is coupled to the first carrier 300. One of the components 200, illustrated in FIG. 2, may be positioned adjacent the top surface 302a of the first carrier 200 such that the first carrier coupling members 204 that are located on the side surface 202e of the component 200 engage the coupling pegs that extend from the rigid walls 306, as illustrated in FIG. 6b. The component 200 may then be pivoted about the engagement of the first carrier coupling members 204 and the coupling pegs while the resilient members 304 are deflected away from the component 200 such that the component 200 may enter the first component channel 308, and the coupling pegs 304a on the first resilient members 304 may engage the first carrier coupling members that are located on the side surface 202f of the component 200 when the first resilient members 304 are released from their deflection, as illustrated in FIG. 6c. As can be seen in the illustrated embodiment, the features included on the first carrier 300 allow the component 200 to couple to the first carrier 300, adjacent the top surface 302a, free of the use of tool. With the component 200 coupled to the first carrier 200 adjacent the top surface 302a, the component 200 may be in engagement with the EMI grounding member 318. The method 600 then proceeds to block 606 where a second component is coupled to the first carrier 300. One of the components 200 may be positioned in the second component channel 314 adjacent the bottom surface 302b of the first carrier 200 and coupled to the first carrier 200 in substantially the same manner as the other component 200 was coupled to the first carrier 300 adjacent the top surface 302a but while using the first resilient members 310 and the rigid walls 312 (i.e., free of the use of a tool), as illustrated in FIG. 6d. In an embodiment, with the component 200 coupled to the first carrier 300 adjacent the bottom surface 302b, the component 200 may be in engagement with the EMI grounding member 318. In an embodiment, the components 200 are coupled to the top surface 302a and the bottom surface 302b of the first carrier 300 in an orientation such that the rotation of disks that are located in the component 200 occurs in the same direction of rotation in order to, for example, minimize potential issues related to component performance.

Figure 6E:
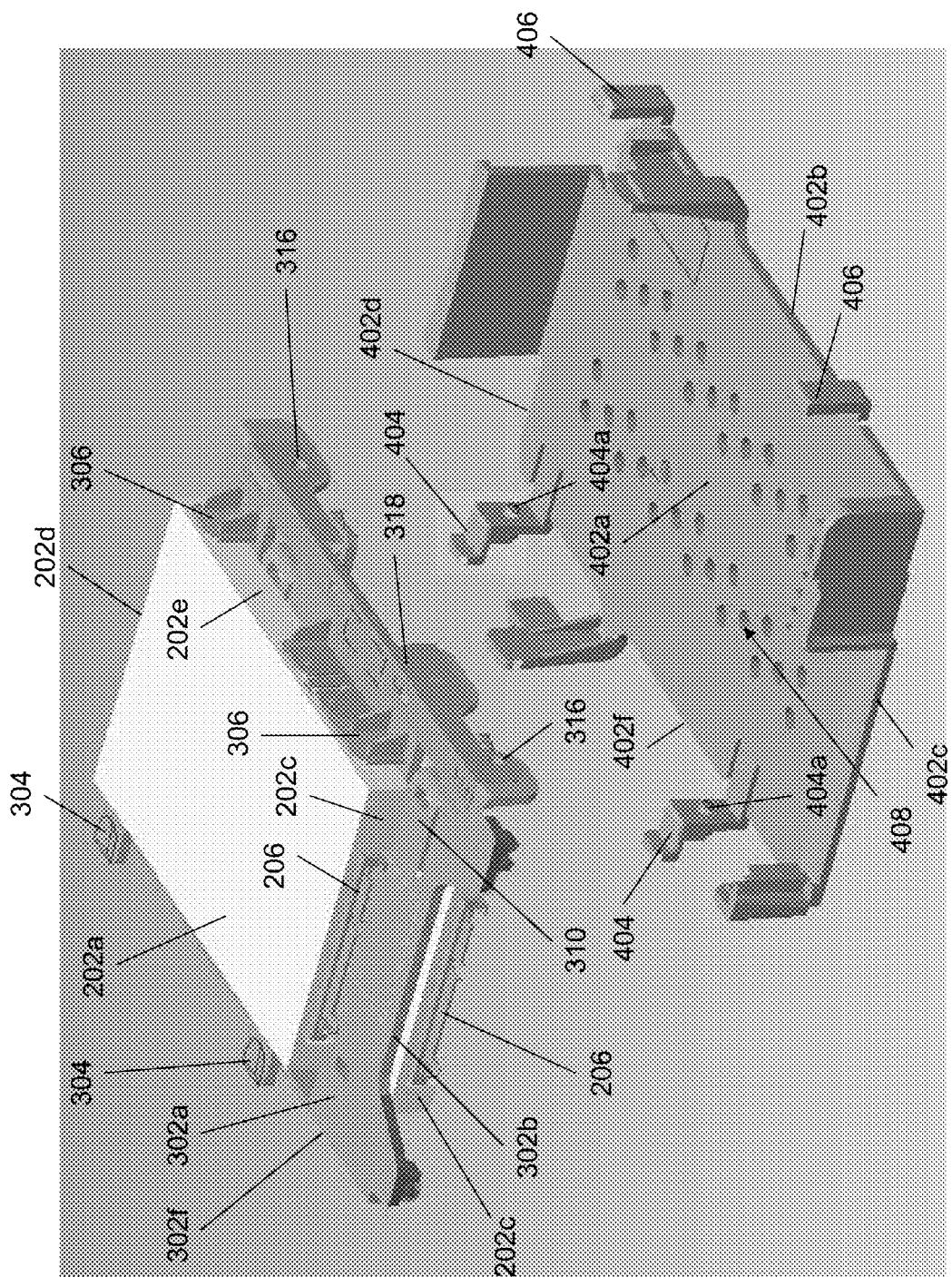
FIG. 6e is a perspective view illustrating an embodiment of the first carrier and the components of FIG. 6d being coupled to the second carrier of FIG. 4.
Figure 6F:
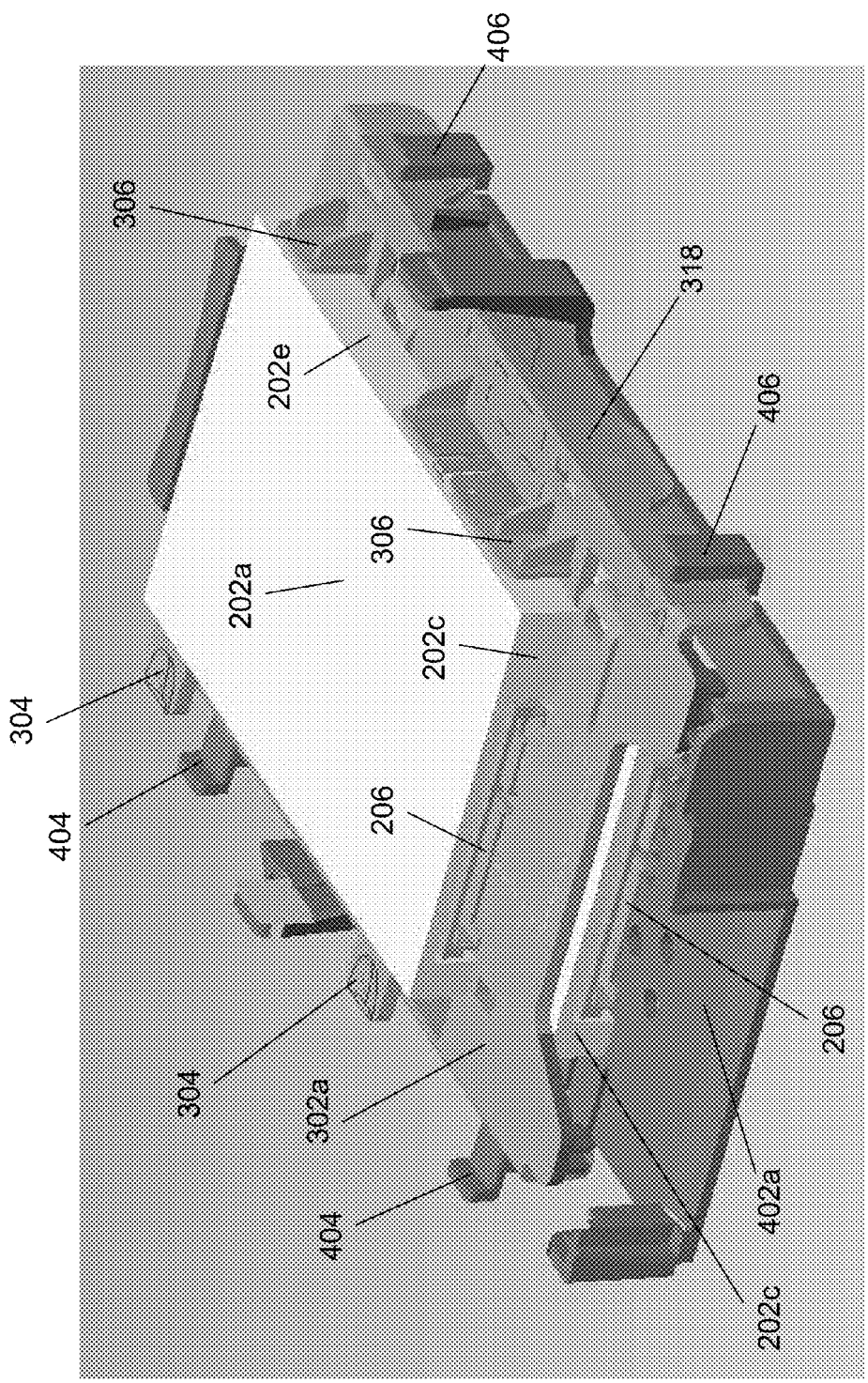
FIG. 6f is a perspective view illustrating an embodiment of the first carrier and the components of FIG. 6d coupled to the second carrier of FIG. 4.

Referring now to FIGS. 4, 6a, 6d, 6e and 6f, the method 600 then proceeds to block 608 where the first carrier 300 including the components 200, illustrated in FIG. 6d, is coupled to the second carrier 400, illustrated in FIG. 4. The first carrier 300 including the components 200 is positioned adjacent the second carrier 400 such that component 200 coupled to the first carrier adjacent the bottom surface 302b is located adjacent the top surface 402a of the second carrier 400, as illustrated in FIG. 6e. The first carrier 300 including the components 200 is then moved into first carrier channel 408 such that the coupling pegs on the rigid members 406 engage the second carrier coupling members 316 on the side edge 302e of the first carrier 300. The resilient members 404 are then deflected to allow the remainder of the first carrier 300 and the components 200 to enter the first carrier channel 408, and the resilient members 404 are then released such that the coupling pegs 404a engage the second carrier coupling members 316 on the side edge 302f of the first carrier 300 to secure the first carrier 300 to the second carrier 400, as illustrated in FIG. 6f. As can be seen from the illustrated embodiment, the features on the first carrier 300 and the second carrier 400 allow the first carrier 300 to couple to the second carrier 400 free of the use of a tool.

Figure 6G:
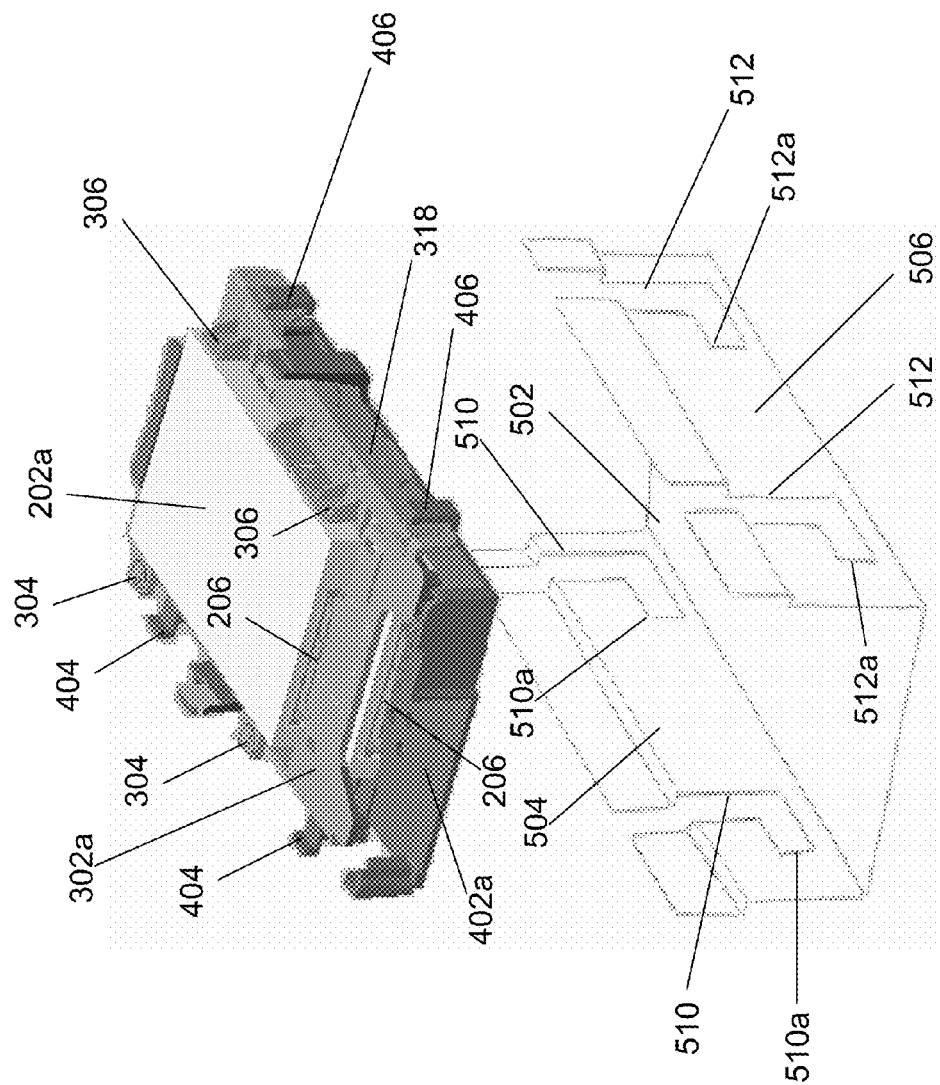
FIG. 6g is a perspective view illustrating an embodiment of the first carrier, the components, and the second carrier of FIG. 6f being mounted to the chassis of FIG. 5.
Figure 6H:
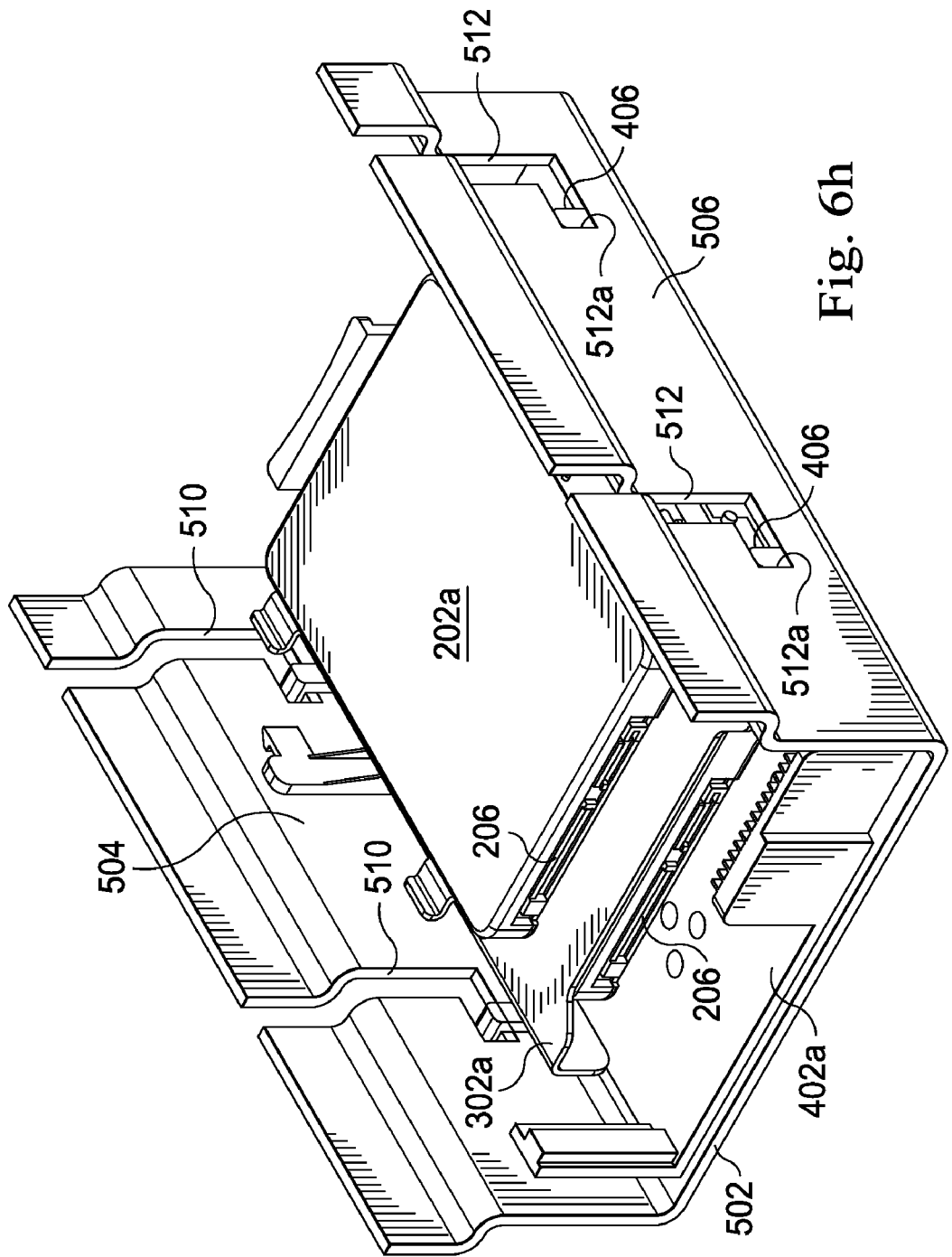
FIG. 6h is a perspective view illustrating an embodiment of the first carrier, the components, and the second carrier of FIG. 6f mounted to the chassis of FIG. 5.
Figure 7:
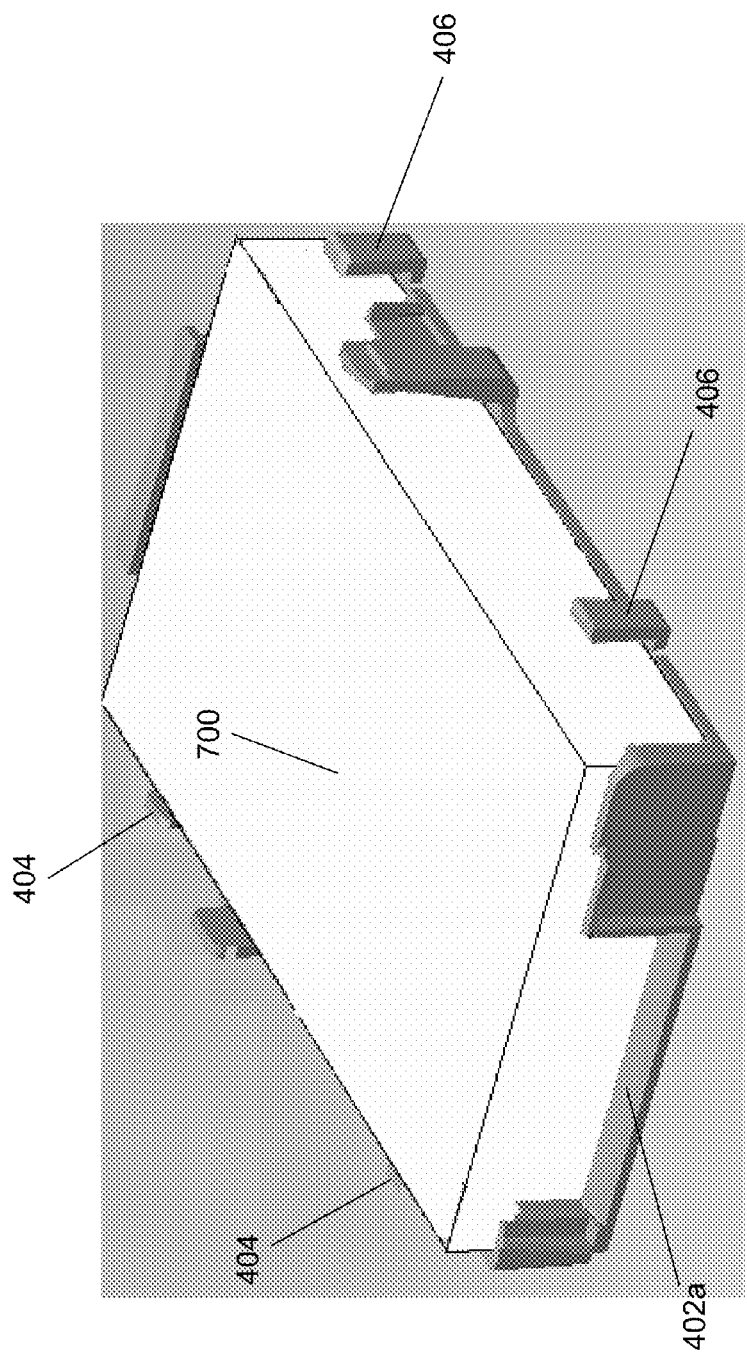
FIG. 7 is a perspective view illustrating an embodiment of the second carrier of FIG. 4 coupled to a component that is larger than the component of FIG. 2.

Referring now to FIGS. 5, 6a, 6f, 6g and 6h, the method 600 then proceeds to block 610 where the first carrier 300, the components 200, and the second carrier 400 are mounted in the chassis 500. The first carrier 300, the components 200, and the second carrier 400 are positioned adjacent the chassis 500 such that the bottom surface 402b of the second carrier 400 is located adjacent the chassis component slot 508, with the resilient members 404 aligned with the component coupling channels 510 and the rigid members 406 aligned with the component coupling channels 512, as illustrated in FIG. 6g. The second carrier 400 is then moved towards the chassis 500 such that the resilient members 404 enter the component coupling channels 510, and the rigid members 406 enter the component coupling channels 512. The resilient members 404 and the rigid members 406 may then be moved in the securing sections 510a and 512a of the component coupling channels 510 and 512, respectively, to mount the second carrier 400 to the chassis 500, as illustrated in FIG. 6h. In an embodiment, the chassis 500 may include connectors that couple the components to a processor such as, for example, the processor 102, described above with reference to FIG. 1 through the IHS connectors 206 on the components 200. As can be seen from the illustrated embodiments, the second carrier 400 and the chassis 500 include features that allow the second carrier 400 to couple to the chassis 500 free of the use of a tool. In an embodiment, the second carrier 400 is dimensioned to hold a single 3.5" storage device 700, illustrated in FIG. 7, that may be coupled to the second carrier 400 in a similar manner as described above for the first carrier 300 and as illustrated in FIG. 7. In an embodiment, different features on the second carrier 400 other than the resilient members 404 and the rigid members 406 may be used to mount the second carrier 400 to the chassis 500. Thus, a multiple component mounting system is provided that allows a carrier which is dimensioned to couple to a 3.5" storage device to toollessly couple to a carrier that toollessly couples to two 2.5" storage devices. Such a system frees up chassis slots that would conventionally be used to house a second 3.5" storage device, and supports Redundant Array of Independent/Inexpensive Disks (RAID) technology. As such, the system results in an increased feature set, reduced power consumption, and ease of manufacture.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multiple component mounting system, comprising:
a first carrier comprising a base having a first surface and a second surface facing opposite the base from the first surface;
a plurality of first component coupling members extending from the first surface of the base and defining a first component channel, wherein at least one of the first component coupling members comprise a first resilient member that is operable to engage a first component when the first component is located in the first component channel in order to secure the first component to the base free of the use of a tool;
a plurality of second component coupling members located extending from the second surface of the base and defining a second component channel, wherein at least one of the second component coupling members comprise a second resilient member that is operable to engage a second component when the second component is located in the second component channel in order to secure the second component to the base free of the use of a tool; and
a plurality of second carrier coupling members located on the base and operable to secure the base to a second carrier.

2. The system of claim 1, wherein the base comprises a first side that faces a first direction and a second side that faces a second direction that is opposite the first direction, and wherein the plurality of first component coupling members are located on the first side of the base and the plurality of second component coupling members are located on the second side of the base.

3. The system of claim 1, wherein the plurality of first component coupling members comprise a rigid wall including a first coupling peg and the first resilient member including a second coupling peg and located opposite the first component channel from the rigid wall.

4. The system of claim 1, further comprising:
an electromagnetic interference grounding member coupled to the base.

5. A multiple component mounting system, comprising:
a first carrier comprising a base;
a plurality of first component coupling members located on the base and defining a first component channel, wherein at least one of the first component coupling members comprise a first resilient member that is operable to engage a first component when the first component is located in the first component channel in order to secure the first component to the base free of the use of a tool;
a plurality of second component coupling members located on the base and defining a second component channel, wherein at least one of the second component coupling members comprise a second resilient member that is operable to engage a second component when the second component is located in the second component channel in order to secure the second component to the base free of the use of a tool, and wherein the plurality of second component coupling members comprise a rigid wall including a first coupling peg and the second resilient member includes a second coupling peg and is located opposite the second component channel from the rigid wall; and
a plurality of second carrier coupling members located on the base and operable to secure the base to a second carrier.

6. A multiple component mounting system, comprising:
a first carrier comprising a base;
a plurality of first component coupling members located on the base and defining a first component channel, wherein at least one of the first component coupling members comprise a first resilient member that is operable to engage a first component when the first component is located in the first component channel in order to secure the first component to the base free of the use of a tool;
a plurality of second component coupling members located on the base and defining a second component channel, wherein at least one of the second component coupling members comprise a second resilient member that is operable to engage a second component when the second component is located in the second component channel in order to secure the second component to the base free of the use of a tool;
a plurality of second carrier coupling members located on the base and operable to secure the base to a second carrier; and
a second carrier comprising a plurality of first carrier coupling members that define a first carrier channel, wherein at least one of the first carrier coupling members comprise a second carrier resilient member that is operable to engage the first carrier when the first carrier is located in the second component channel in order to secure the first carrier to the second carrier free of the use of a tool.

7. A multiple component mounting system, comprising:
a first carrier comprising a base;
a plurality of first component coupling members located on the base and defining a first component channel, wherein at least one of the first component coupling members comprise a first resilient member that is operable to engage a first component when the first component is located in the first component channel in order to secure the first component to the base free of the use of a tool;
a plurality of second component coupling members located on the base and defining a second component channel, wherein at least one of the second component coupling members comprise a second resilient member that is operable to engage a second component when the second component is located in the second component channel in order to secure the second component to the base free of the use of a tool;
a plurality of second carrier coupling members located on the base and operable to secure the base to a second carrier;
a first component located in the first component channel and secured to the base through the engagement of the first component and the first component coupling members; and
a second component located in the second component channel and secured to the base through the engagement of the second component and the second component coupling members.

8. An information handling system (IHS), comprising:
an IHS chassis defining a chassis component slot;
a processor located in the IHS chassis;
a second carrier located in the chassis component slot and comprising a plurality of first carrier coupling members that define a first carrier channel;
a first carrier located in the first carrier channel and comprising:
a base;
a plurality of first component coupling members located on the base and defining a first component channel;

a plurality of second component coupling members located on the base and defining a second component channel; and a plurality of second carrier coupling members that are located on the base and that engage the first carrier coupling member on the second carrier in order to secure the first carrier to the second carrier free of the use of a tool;

a first component that is located in the first component channel and that engages the plurality of first component coupling members in order to secure the first component to the base free of the use of a tool; and a second component that is located in the second component channel and that engages the plurality of second component coupling members in order to secure the second component to the first base free of the use of a tool.

9. The system of claim 8, wherein the base comprises a first side that faces a first direction and a second side that faces a second direction that is opposite the first direction, and wherein the plurality of first component coupling members are located on the first side of the base and the plurality of second component coupling members are located on the second side of the base.

10. The system of claim 8, wherein at least one of the first component coupling members comprise a first resilient member that engages the first component that is located in the first component channel in order to secure the first component to the base free of the use of a tool.

11. The system of claim 10, wherein the plurality of first component coupling members comprise a rigid wall including a first coupling peg and the first resilient member including a second coupling peg and located opposite the first component channel from the rigid wall.

12. The system of claim 8, wherein at least one of the second component coupling members comprise a second resilient member that engages the second component that is located in the second component channel in order to secure the second component to the base free of the use of a tool.

13. The system of claim 12, wherein the plurality of second component coupling members comprise a rigid wall including a first coupling peg and the second resilient member including a second coupling peg and located opposite the second component channel from the rigid wall.

14. The system of claim 8, further comprising:
an electromagnetic interference grounding member coupled to the base.

15. The system of claim 8, wherein the first component and the second component are coupled to the processor.

16. The system of claim 8, wherein the second carrier and the IHS chassis comprise features such that the second carrier is located in the chassis component slot and secured in the IHS free of the use of a tool.

17. A method for mounting multiple components in an information handling system (IHS), comprising:
providing a first carrier comprising a plurality of first component coupling members that extends from a first surface on the first carrier and define a first component channel and a plurality of second component coupling members that extends from a second surface on the first carrier and define a second component channel, wherein the first surface and the second surface face opposite directions;

securing a first component to the first carrier by locating the first component in the first component channel and engaging the first component with the plurality of first component coupling members free of the use of a tool;

securing a second component to the first carrier by locating the second component in the second component channel and engaging the second component with the plurality of second component coupling members free of the use of a tool; and mounting the first carrier in an IHS chassis.

18. The method of claim 17, further comprising:
coupling the first component and the second component to a processor that is located in the IHS chassis.

19. A method for mounting multiple components in an information handling system (IHS), comprising:
providing a first carrier comprising a plurality of first component coupling members that define a first component channel and a plurality of second component coupling members that define a second component channel;

securing a first component to the first carrier by locating the first component in the first component channel and engaging the first component with the plurality of first component coupling members free of the use of a tool;

securing a second component to the first carrier by locating the second component in the second component channel and engaging the second component with the plurality of second component coupling members free of the use of a tool;

providing a second carrier comprising a plurality of first carrier coupling members that define a first carrier channel;

securing the first carrier to the second carrier by locating the first carrier in the first carrier channel and engaging the first carrier with the plurality of first carrier coupling members free of the use of a tool; and mounting the first carrier in an IHS chassis.

20. The method of claim 19, wherein the mounting the first carrier in the IHS chassis comprises mounting the second carrier to the IHS chassis free of the use of a tool.

21. A multiple component tooless mounting system comprising:
a first carrier having a first side and a second side opposite the first side;

a first component resiliently mounted by coupling members on the first side of the first carrier;

a second component resiliently mounted by coupling members on the second side of the first carrier;

a second carrier, the first carrier including the first and second components, being mounted on the second carrier; and a chassis, the first and second carriers including the first and second components, being mounted in coupling channels in the chassis, whereby the carriers, components and chassis are secured together in a tooless engagement.

* * * * *